United States Patent

[11] 3,556,180

| | | |
|---|---|---|
| [72] | Inventor | James F. Jones<br>Roscoe, Ill. |
| [21] | Appl. No. | 756,644 |
| [22] | Filed | Aug. 30, 1968 |
| [45] | Patented | Jan. 19, 1971 |
| [73] | Assignee | Beloit Corporation<br>Beloit, Wis.<br>a corporation of Wisconsin. |

[54] APPARATUS FOR PROCESSING FELLED TREES
2 Claims, 2 Drawing Figs.

[52] U.S. Cl. .................................................. 144/2, 144/309
[51] Int. Cl. ............................................. A01g 23/02
[50] Field of Search ........................................ 144/2—(21), 3—(4), 34, 34—(1—6), 309—(34)

[56] References Cited
UNITED STATES PATENTS

| 3,385,333 | 5/1968 | Eynon ........................ | 144/309 |
| 3,398,774 | 8/1968 | Hahn .......................... | 144/309 |
| 3,443,611 | 5/1969 | Jorgensen ................... | 144/2 |

*Primary Examiner*—Gerald A. Dost
*Attorney*—Dugger, Peterson, Johnson & Westman ABSTRACT: A grapple and delimbing head travel in opposite directions. The grapple feeds or advances a felled tree in the direction of a shear mechanism and the delimbing head moves in an opposite direction to remove the branches from the tree.

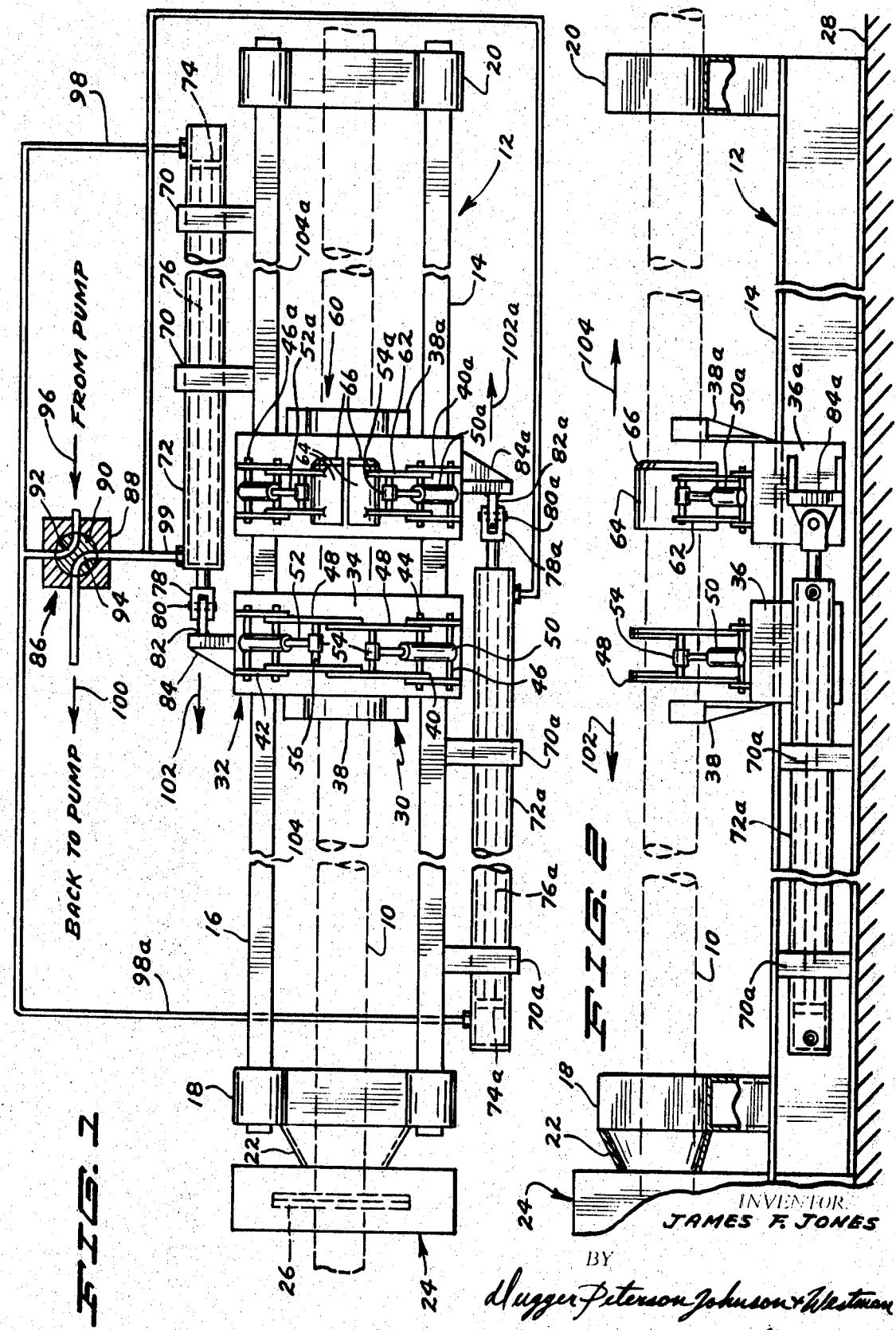

APPARATUS FOR PROCESSING FELLED TREES

BACKGROUND OF THE INVENTION

1. Field of the Invention

This invention relates to the processing of felled trees and pertains more particularly to apparatus for delimbing and slashing tree-length logs into bolts of suitable length.

2. Description of the Prior Art

Trees have been delimbed in the past while still standing or after having been felled. Actually, trees can be processed quite rapidly while still vertical. However, the equipment for doing this can prove to be quite costly. The smaller logging operator is usually interested in less expensive equipment.

Therefore, mobile apparatus has been devised which severs the tree and by means of an articulated boom delivers the felled tree in a horizontal position to the delimbing equipment where it is incrementally fed to the slasher or shear mechanism, the boom itself frequently being used to accomplish the feeding.

The above-referred to processor makes use of a stationary delimber and the feeding simply involves advancing the felled tree relative to the delimber. Even when a special traveling grapple is used in lieu of the boom type of feed, the procedure is relatively slow.

SUMMARY OF THE INVENTION

The present invention has for a primary object the simultaneous delimbing and feeding of a felled tree. More specifically, it is an aim of the invention to have the delimbing head travel in one direction while the grapple is moving in an opposite direction and thereby more efficiently and rapidly delimb the felled tree as it is being fed to a shear mechanism where it is slashed into bolts of appropriate length.

BRIEF DESCRIPTION OF THE DRAWING

FIG. 1 is a top plan view of apparatus diagrammatically illustrating my invention, and FIG. 2 is a side elevational view corresponding to FIG. 1.

DESCRIPTION OF THE PREFERRED EMBODIMENT

Referring now in detail to the drawing, a felled tree has been depicted in phantom outline and has been given the reference numeral 10. This is the tree that is to be delimbed and slashed into bolts of suitable length, although no branches have been depicted.

The apparatus embodying my invention comprises a base or frame 12 which includes a pair of parallel, laterally spaced rails 14, 16 constituting a fixed track. The rails 14, 16 are connected at their opposite ends by cradles 18, 20 which support the tree 10 for slidable advancement thereon. Additional support for the tree 10 is also provided which will be described in greater detail hereinafter. At this time, attention is directed to a truncated cone or funnel 22 that guides the tree 10 as it is fed into a shear mechanism labeled 24 which includes blades 26 shown in dotted outline. It is, of course, the shear mechanism 24 that slashes the tree 10 into bolts of suitable length, usually 6 or 8 feet long. The specific bolt length is unimportant to a practicing of the present invention; actually, bolts or sticks of any desired length can be cut with my apparatus.

Although it will be obvious from the ensuing description, it perhaps should be pointed out at this stage that the surface labeled 28 on which the rails 14, 16 are fixedly disposed may constitute the chassis of a vehicle if my apparatus is to be utilized in association with mobile tree harvesting equipment. As a matter of fact, the invention lends itself readily to employment with portable processors because of its unique operation. However, it should be understood that my apparatus is not limited to mobile or portable application.

At this time reference will be made to a grapple or tree advancing mechanism denoted generally by the reference numeral 30 that travels along the rails 14, 16. The grapple mechanism 30 in the illustrated situation comprises a U-shaped movable frame or carriage 32 composed of a horizontal panel 34 and vertical end panels 36 depending downwardly from the ends of the panel 34. Fixedly attached to the frame 32 is an auxiliary cradle or support 38 that in actual practice would be centrally located on the panel 34 under components now to be described. However, it can be shown better when displaced. The support 38 assists the previously mentioned cradles 18, 20 in supporting the tree 10.

Included in the construction of the grapple mechanism 30 are two pairs of upstanding plates 40 and 42. The plates 40, 42 serve as bearing mounts for first shafts 44 and second shafts 46, as can be seen in FIG. 1.

The shafts 44 pivotally support the lower ends of a pair of curved arms or jaws 48 that perform the grappling function. For the purpose of actuating the arms or jaws 48 against the tree 10 are cylinders 50 having their closed ends attached to the shafts 46 in each instance. Each cylinder has a piston rod 52 that is forced outwardly by hydraulic pressure. The free end of each piston rod 52 has a sleeve bearing 54 affixed thereto which loosely encircles a rod 56 extending between each pair of arms 48. It is not believed necessary to show the hydraulic lines or hoses that supply hydraulic fluid to the cylinders 50. The arms 48 are actuated in unison toward and away from the felled tree 10 in the performance of their gripping action.

Passing now to a description of the delimber mechanism indicated generally by the reference numeral 60, it will be observed from the drawing that this mechanism comprises certain components that can, if desired, be identical to most of the components included in the grapple mechanism 30. As a matter of fact, the delimbing mechanism 60 now to be described delimbs when moved in one direction and is preferably used as a grapple when traveling in a reverse direction. At any rate, the members or components 32a—46a and 50a—56a correspond to the members 32—46 and 50—56 of the grapple mechanism 30. The arms 62 of the delimbing mechanism 60 differ in configuration from the arms 48 in that they carry at their free ends a pair of curved delimbing blades 64 having knife edges 66 at one edge which sever the branches during the delimbing operation.

While a chain mechanism could be used for actuating the grappling mechanism 30 and the delimbing mechanism 60 in opposite directions, the invention will be described with respect to a hydraulic operating means. Accordingly, it will be noted that there are a pair of laterally directed brackets 70 attached to one side of the rail 16 and a similar pair of brackets 70a on the rail 14. These brackets hold in a fixed manner cylinders 72, 72a. A piston 74, 74a is illustrated in dotted outline in the cylinders 70, 70a and a piston rod 76, 76a projects from its particular cylinder. Mounted on the rod 76 is a clevis 78 which carries a clevis pin 80. Likewise, the rod 76a has a clevis 78a and a clevis pin 80a. The clevis pins 80, 80a pass through ears 82, 82a disposed on laterally extending arms 84, 84a on each of the frames 32, 32a, more specifically on one of their vertical end panels 34, 34a in each instance.

The hydraulic system further embraces a two-position valve 86 of conventional construction, the valve 86 being schematically portrayed as having a valve body 88 in which a rotatable plug 90 is disposed. The plug 90 is formed with passages 92, 94. The passage 92 receives hydraulic fluid under pressure from a pump (not shown) which supplies fluid in the direction of the arrow 96. After entering the valve 86, the fluid flows through the particular passage 92 into conduits 98 and 98a which lead to the closed ends of the cylinders 72, 72a. On the other hand, the return to the pump is indicated by the arrow 100, the fluid from the open ends of the cylinders 72, 72a flowing through conduits 99, 99a. In this way, the two frames or carriages 32 and 32a are forced to move from the proximal relationship depicted in the drawing in opposite directions toward the end cradles 18 and 20 as indicated by the arrows 102 and 102a, respectively.

Having presented the foregoing description, the manner in which my apparatus functions should be readily understood. However, a brief explanation should suffice to make certain that the benefits to be derived are fully appreciated.

First, fluid under pressure is delivered via hydraulic lines or conduits (not shown) into the various cylinders 50, 50a adjacent their open ends so that the piston rods 52, 52a are pulled inwardly into their respective cylinders with the consequence that the arms 48 and the arms 62 are spread open. It is with the arms 48 and 62 open that the tree 10 can be deposited or laid on the supports 18, 20, 38 and 38a.

When the arms 48 and 62 are urged toward each other by introducing hydraulic fluid into the closed ends of the cylinders 50, 50a, the arms 48 and the blades 64 are pressed against the tree 10 preparatory to initiating the following processing procedure.

With the valve 86 in the position in which it appears in FIG. 1, then the fluid under pressure will flow into the closed ends of the cylinders 72, 72a so as to cause their respective piston rods 76, 76a to be forced outwardly. This causes the grapple mechanism 30 to move toward the shear mechanism 24 and the delimbing mechanism 60 to move in an opposite direction toward the end of the apparatus where the cradle 20 is situated. Consequently, with the blades 26 of the shear mechanism 24 open, the tree 10 is fed or advanced into position for the severing of the first bolt. Usually, the butt or trunk portion of a felled tree has no branches for the initial length thereof so there is no need for delimbing this portion of the tree 10.

It will be discerned that the apparatus is shown broken at 104 and 104a to indicate that the rails 14, 16 may be of any preferred length.

As the grapple and delimbing mechanism 30 and 60 move in opposite directions, the mechanism 30 advancing the tree 10 and the mechanism 60 removing the branches therefrom, it should be appreciated that where the travel speeds are equal, the relative speed is twice that which would exist if the mechanism 60 were not moving. Hence, there is a degree of impact shearing developed that more effectively severs the limbs or branches without resort to motion or speed multiplying devices.

The mechanisms 30, 60 need not move all the way to the cradles 18 and 20. Instead, the operator may cause them to move whatever distance he chooses. If the rails 14, 16 are relatively short and the bolt length relatively long, the feeding can be accomplished in incremental stages.

However, assuming that the entire stroke of the piston 76, 76a is utilized and that mechanisms 30, 60 have for all intents and purposes reached the cradle 18, 20, the pistons 52 are then retracted by causing fluid to enter the cylinders 50 at the inlets adjacent the open ends of these two cylinders. This conditions the grapple mechanism 30 for its return trip.

On the other hand, the delimbing mechanism 60 need not be so operated. Instead, the pistons 52a may remain in their extended relationship and preferably the hydraulic pressure is increased so as to force the blades 64 firmly against the tree 10.

Then, the plug 90 of the valve 86 may be rotated counterclockwise a quarter turn (90° as viewed in FIG. 1 and then the hydraulic fluid arriving from the pump in the direction of the arrow 96 is directed through the passage 94 into the open ends of the cylinders 72, 72a. This results in a retraction of the piston rods 76, 76a and a concomitant pulling of the mechanisms 30, 60 toward each other. Stated somewhat differently, the mechanisms 30, 60 return to the proximal relation in which they appear in the drawing.

With the blades 64 pressed tightly against the tree 10 during the return trip of the delimbing mechanism 60, it follows that the tree 10 is advanced or fed toward the shear mechanism 24. In other words, the mechanism 60 at this time serves as a grapple, whereas the mechanism 30 does not (because its arms 48 are open or spread apart).

It is important to realize that not only is the shearing speed which severs the limbs or branches automatically multiplied by a factor of two for equal rates of travel of the mechanisms 30 and 60, but the effective or production feed rate of the tree 10 is doubled because of the dual role played by the mechanism 60. Hence, a highly efficient and effective processing of felled trees can be realized when practicing the teachings of my invention.

I claim:

1. Apparatus for processing felled trees comprising an elongated base means including a pair of spaced parallel rails forming a track, a shear mechanism located adjacent one end of said base means, a tree advancing mechanism mounted for reciprocal movement on said track in a first direction from an intermediate position toward said shear mechanism, said tree advancing mechanism including a pair of grapple jaws each pivotal about a horizontal axis, a delimbing mechanism mounted for reciprocal movement from said intermediate position in a second direction away from said shear mechanism, said delimbing mechanism including a pair of delimbing blades each pivotal about a horizontal axis, a first cylinder fixedly located alongside one of said rails having a piston rod connected to said tree advancing mechanism for propelling said tree advancing mechanism toward said shear mechanism from said intermediate position when said piston rod is extended and returning said tree advancing mechanism to said intermediate position when its piston rod is retracted, a second cylinder fixedly located alongside the other of said rails having a piston rod connected to said delimbing mechanism for propelling said delimbing mechanism in said second direction when its piston rod is extended and returning said delimbing mechanism to said intermediate position when its piston rod is retracted, and means for selectively introducing fluid under pressure into the remote ends of said cylinders to simultaneously extend both of said piston rods and to introduce fluid under pressure into the other or nearer ends of said cylinders to simultaneously retract said piston rods whereby when said piston rods are extended said mechanisms are simultaneously moved in opposite directions to perform a combined feeding and delimbing operation and when said piston rods are retracted said mechanism are simultaneously returned to their said intermediate position.

2. Apparatus as set forth in claim 1 in which said last-mentioned means includes a two-position valve for directing fluid under pressure into said remote ends of said cylinders when in one position and into said other ends when in its second position.